United States Patent
Douglas et al.

(10) Patent No.: US 10,289,468 B1
(45) Date of Patent: *May 14, 2019

(54) IDENTIFICATION OF VIRTUAL COMPUTING INSTANCE ISSUES

(71) Applicant: Amazon Technologies, Inc., Seattle, WA (US)

(72) Inventors: Jeffrey Andrew Douglas, Seattle, WA (US); Heath David Petty, Maple Valley, WA (US); Troy Dalton Emmerson, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/080,405

(22) Filed: Mar. 24, 2016

Related U.S. Application Data

(63) Continuation of application No. 14/040,189, filed on Sep. 27, 2013, now Pat. No. 9,304,796.

(51) Int. Cl.
*G06F 11/00* (2006.01)
*G06F 11/07* (2006.01)

(52) U.S. Cl.
CPC ........ *G06F 11/079* (2013.01); *G06F 11/0712* (2013.01); *G06F 11/0751* (2013.01); *G06F 11/0787* (2013.01)

(58) Field of Classification Search
CPC .......................... G06F 11/079; G06F 11/0712
USPC ............ 714/4.11, 4.1, 4.2, 4.3, 6.31, 26, 48
See application file for complete search history.

(56) References Cited

U.S. PATENT DOCUMENTS

| | | | |
|---|---|---|---|
| 9,304,796 B1 * | 4/2016 | Douglas | G06F 11/2028 |
| 2010/0192220 A1 * | 7/2010 | Heizmann | G06F 11/3664 |
| | | | 726/19 |
| 2011/0197097 A1 * | 8/2011 | Beaty | H04L 41/16 |
| | | | 714/27 |
| 2011/0214018 A1 * | 9/2011 | Vidal | G06F 11/0751 |
| | | | 714/25 |
| 2011/0320882 A1 * | 12/2011 | Beaty | G06F 8/63 |
| | | | 714/45 |

\* cited by examiner

*Primary Examiner* — Dieu Minh T Le
(74) *Attorney, Agent, or Firm* — Thorpe North & Western, LLP

(57) ABSTRACT

Technology for identifying virtual computing instance issues is described. An operating information report of a virtual computing instance may be parsed to obtain a diagnostic result. The diagnostic result may be compared against a data store of known computing instance issues to determine whether there is an issue for the virtual computing instance. The issue may be flagged when identified and provided for resolution.

18 Claims, 8 Drawing Sheets

IDENTIFICATION OF VIRTUAL COMPUTING INSTANCE ISSUES

This application is a Continuation of U.S. patent application Ser. No. 14/040,189, filed on Sep. 27, 2013, which is incorporated herein by reference.

BACKGROUND

Computing devices have increased the efficiency of many business operations. As technology improves, the functionality and efficiency of computing devices may be extended or improved. Technical advances in computing devices, however, may also result in increased complexity in the operation or maintenance of the computing devices. One result of increased complexity may be an increase in the difficulty of trouble-shooting and correcting computing device operations in the event of a malfunction or undesired operation.

Adding or removing hardware or software components to a computing system may have an effect on performance or operation of existing hardware or software components. This may be applicable for physical computing devices or virtual computing instances. In some examples, the effect on performance or operation may be negative. Additionally, configuration changes for systems, misconfiguration of systems, as well as data corruption, user error and other factors may negatively affect performance or operation of computing systems.

Traditionally, users of computing systems may contact a technician, a customer service center or the like to seek assistance in fixing problems or otherwise resolving system operation issues. However, communicating issues about the computing system to a technician may be difficult for any number of reasons. For example, the user may have difficulty adequately expressing problematic symptoms, the user may be unaware of what the problem is, the technician may be typically unable to personally inspect the system, the technician be unable to accurately diagnose the problem without additional information and so forth.

DETAILED DESCRIPTION

The present technology may be used to identify virtual computing instance issues. For example, an operating information report from a virtual computing instance may be parsed to obtain a diagnostic result. The diagnostic result may be compared against a data store of known computing instance issues to determine whether there is a potential issue for the virtual computing instance. Potential issues may be flagged when identified and these potential issues may be provided for display.

In a more detailed example, the operating information report may be received at a storage location or a virtualized storage service from a virtual computing instance. The operating information report may be the result of a request from a user of the virtual computing instance to create the operating information report or the operating information report may be created automatically by the virtual computing instance in response to an event or according to a schedule. A management server may parse the operating information report to obtain a diagnostic result. For example, the management server may perform an machine driven analysis of a string of words, numbers, symbols, values, etc. in the operating information report into its constituents, resulting in a parse tree showing a syntactic relation of the constituents to one other, which may also contain semantic information, monitoring data, virtual computing instance statistics, and other information. The diagnostic result may be compared against the issues data store, which may contain known virtual computing instance issues, to determine whether there is an existing issue for the virtual computing instance. The issues data store or a different data store may include diagnostic scripts, analysis tools or other data for identifying existing issues. When issues are identified for the virtual computing instance, these issues may be flagged. A user may be notified of the issues. In one example, the notification may further include information relating to a cause of the flagged existing issue and a suggested or possible solution to resolve the flagged potential issue.

Figure 1:
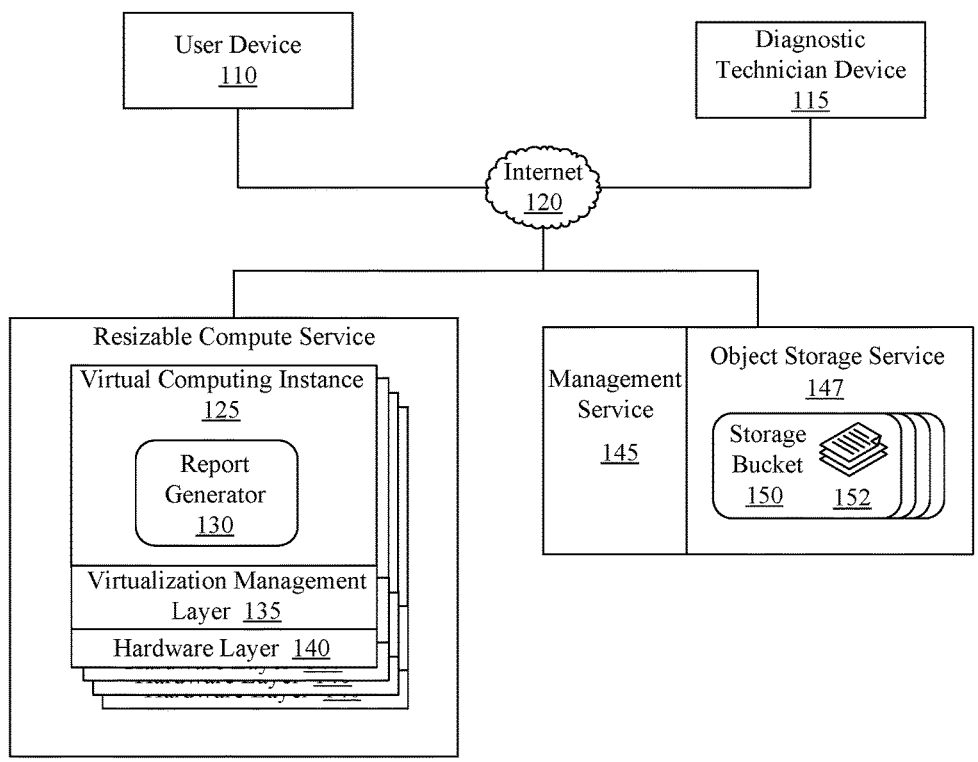
FIG. 1 is a schematic overview of an example system for providing an operating information report in accordance with an example of the present technology.

FIG. 1 is a schematic overview of a system for identifying virtual computing instance issues. The system may be implemented in any of a variety of configurations. The example in FIG. 1 is for illustration purposes and is not intended to be limiting of potential configurations of systems. The system may be implemented using a virtualized computing platform. A user may operate one or more virtual computing instances 125 to execute an operating system and computing applications. A user may create, launch, and terminate virtual computing instances 125 as desired. The user may have some control over the geographical location of virtual computing instances 125 to optimize latency and provide high levels of redundancy.

The user may access and manage the one or more virtual computing instances 125 over a network connection, such as a connection through the Internet 120, for example. The user may perform various operations on the virtual computing instance(s) 125 such as adding, updating, modifying, deleting or other otherwise maintaining software or services on the virtual computing instance 125. These operations may be performed by the user from a user device 110.

The virtual computing instance 125 may be part of the virtualization computing platform, which may include a virtual distributed computing system with a virtualization management layer 135 executing on a hardware layer 140. The hardware layer 140 may include a plurality of physical computers, servers or processing nodes. In this way, the virtualization management layer 135 may execute across the plurality of computers found in the hardware layer 140. The virtualization management layer 135 may provide a platform on which virtual computing instances 125 may be created. In other words, the virtual computing instances 125 may execute across the plurality of computers found in the hardware layer 140 by using the platform provided by the virtualization management layer 135. For example, the virtualization management layer may contain a hypervisor to manage the virtual computing instances 125.

One operation that a user may perform on the virtual computing instance is the creation of an operating information report 152 that may be used for diagnostic purposes. With reference to FIG. 1, the operating information report may be created using a report generator 130. The operating information report may also be referred to herein as a "diagnostic report" or simply a "report". The operating information report may include any suitable information useful in diagnosing performance or other issues with the virtual computing instance. Some issues that are identifiable using data from the diagnostic report may be issues that have not been recognized by the user, but which may result in sub-optimal performance. The operating information report may include, for example, information such as the status of hardware resources, hardware metrics, system response times, software metrics, logged errors, service statuses, I/O (input/output) statuses, running processes and services, central processing unit (CPU) usage, disk or storage usage, network connections, memory allocation, installed hardware and software, event log details and so forth.

The operating information report 152 may be created at a request of the user and may be created or requested to determine diagnostic or health information of the virtual computing instance 125, such as including information relating to an operating system for the virtual computing instance 125, one or more applications executing on the virtual computing instance 125, hardware upon which the virtual computing instance 125 is operating and so forth. The operating information report 152 may thus include, for example, information related to the operating system and a plurality of the applications, among other information.

The operating information report 152 may be a user-initiated report. In other words, the generation of the operating information report 152 may be at the request of the user, such as a one-time request to generate multiple future reports or an explicit request for each individual report. The operating information report 152 may be generated periodically as a form of a health status monitoring solution for the virtual computing instance 125, where the periodicity of report generation may be user-defined and/or where the periodic operating information reports 152 are generated at the periodic intervals after a single initial request by the user and without further user interaction. Alternatively, the operating information report 152 may be generated each time as a result of user interaction explicitly requesting a one-time operating information report 152. The user may request one-time or periodic operating information reports 152 in the absence of any specific knowledge of issues with the virtual computing instance 125. The user may also request the operating information report 152 in response to perceived performance issues or other issues. However, the user potentially may yet lack any specific knowledge of causes or solutions to the issues with the virtual computing instance 125.

The operating information report 152 may be generated by a report generator 130 that is created by third-party to a developer of the operating system and/or one or more of the applications included in the report. For example, the report generator 130 may comprise third-party software that is not integrated with the operating system or the applications executing on the operation system and the third party software may not be distributed as a package with the operating system or application(s). In one example, the report generator 130 may not initially be integrated with the operating system or the applications, but through installation of the third-party report generator 130, the software may become at least partially integrated with the operating system or one or more of the applications.

Upon creation of the operating information report, the operating information report 152 may be sent to a storage bucket 150 at an object storage service 147 that is accessible through or managed by a management service 145. For example, a diagnostic technician may have access to the storage bucket 150 through the management service 145. Alternatively, the object storage service 147 may be accessed or used directly through an application programming interface (API). The present technology may utilize a signed and/or temporary URL for the user to provide the operating information report file to the object storage service 147. The operating information report 152 may be stored, listed and retrieved as an object in a storage bucket 150. An object may be stored using a representational state transfer (REST) style hypertext transfer protocol (HTTP) interface or a simple object access protocol (SOAP) interface.

Requests for the operating information report 152 may be authorized using an access control list associated with each bucket. Bucket names and keys may be selected so that objects are addressable using HTTP uniform resource locators (URLs). The URL for the operating information report may be created with time-bounded validity. For example, the URL may provide limited time access to store or retrieve the operating information report, such as for a period of 30 minutes, 24 hours or another defined time period. The time-bounded URL may be useful for security purposes, such as to restrict access by third parties to the operating information report, to restrict access by the user to the operating information report after submission to ensure integrity of the operating information report, to limit access or copying rights for a diagnostic technician to data in the operating information report and so forth.

The management service 145 may parse the operating information report and/or use any number of diagnostic scripts or applications to analyze the operating information report. The diagnostic scripts may be scripts for identifying issues, problems, misconfigurations, inefficiencies, problem metrics and so forth in the operation of virtual computing instances, such as may be identified using the data included in the operating information report.

Once one or more issues have been identified, the issues may be flagged and included in a resolution report to the user or to a diagnostic technician. The user or the diagnostic technician may use the resolution report to resolve the issues. For example, the diagnostic technician may use the resolution report to walk the user through resolution of the issues. Furthermore, the diagnostic technician may use the resolution report to study the cause of the issues in order to prevent or minimize occurrence of the issues in the future. The diagnostic technician may also access the operating information report, portions of the operating information report, or an extrapolation of the operating information report (such as the resolution report or a summary of the operating information report) over a network connection via a diagnostic technician device 115.

In one example, the management service 145 may access solution scripts for identifying solutions to flagged issues. The solutions scripts may include information about how to resolve the flagged issues or may even include scripts for resolving the issues on behalf of the user. The solutions scripts or information included therein may be sent to the user or to the diagnostic technician for use in resolving issues. In one example, the solutions scripts may be automatically applied to the virtual computing instance to automatically repair and/or resolve the issues on the virtual computing instance without human intervention, or the scripts may be made available for execution by the user or the diagnostic technician to initiate a resolution process.

Diagnostic technicians may have a limited ability to diagnose problems on the virtual computing instances that contain user operating systems and software where there is no direct access to the virtual computing instances. As a result, troubleshooting virtual computing instance issues may be difficult and inefficient, particularly when the user has limited experience with or limited knowledge of the systems or software involved. The present technology may address these issues by using the operating information report data received from the virtual computing instance and by performing predefined diagnostics on the data, looking for particular issues.

In one example implementation, a diagnostic technician may use data from the operating information report to diagnose virtual computing instance issues or problems. For example, issues flagged in the operating information report may be used to diagnose problems. In another example, the management service may attempt to diagnose the problems using the operating information report and the diagnostic technician may review the information for accuracy or completeness. In another example, the present technology may include an external-facing service to enable users to monitor potential operating system (OS) issues or application configuration issues personally. The external-facing service may be the management service or a different service which obtains at least one of the operating information reports or a processed result of the operating information report and provides an output to report problems and suggest solutions, such as may be viewable via an internet browser application.

The present technology may improve the working efficiency of diagnostic technicians by pointing out problems quickly instead of involving potentially long troubleshooting processes. Further, the present technology may improve efficiency through the external service implementation by allowing users to monitor OS-specific problems rather than involving time and effort of diagnostic technicians because issues may be identified and potentially even resolved without the assistance of the diagnostic technicians. The present technology may also increase the security of sharing user data (for example, when sharing log files) because there may be no direct download process. In other words, an information report or derivative thereof may have access restricted thereto or may be stored in a read-only format as will be described later. Using an internal or external application programming interface (API) available, robust diagnostics may be made available to users or diagnostic technicians with minimal manual intervention and which may also be used to trigger other automated processes for recovery or other resolution and reporting.

The present technology may provide a window into operating system (OS) level infrastructure health and application health for support usage (e.g., by the diagnostic technician). For example, the technology may be applied when given permission by the user providing the diagnostic data. In one example, the technology may enable the user to personally monitor or resolve issues or other events or problems without having to manually investigate a large number of components. The present technology may thus enable an individualized and powerful service for identifying and resolving issues.

The present technology may further be used as a monitoring tool for monitoring virtual computing instance health. In other words, rather than performing diagnostic information on operating information report data received in a report created at the request of a user, the present technology may continually monitor the virtual computing instance and analyze the continuous operating information report data using the scripts described above to identify issues as the issues occur to enable faster response times to issues. For example, the report generator 130 may continually monitor and report data while the management service 145 may continually analyze or otherwise process the data from the report generator.

The present technology may further involve the use of a recovery virtual computing instance. When an error, problem, or other issue is detected with the virtual computing instance 125, the user may launch the recovery virtual computing instance. The recovery virtual computing instance may be a newly created version of the virtual computing instance 125 known to be stable which may be used in place of the virtual computing instance 125. In another example, the recovery virtual computing instance may perform actions relative to the virtual computing instance 125, such as stopping the virtual computing instance 125, checking virtual computing instance resources, and so forth.

Figure 2A:
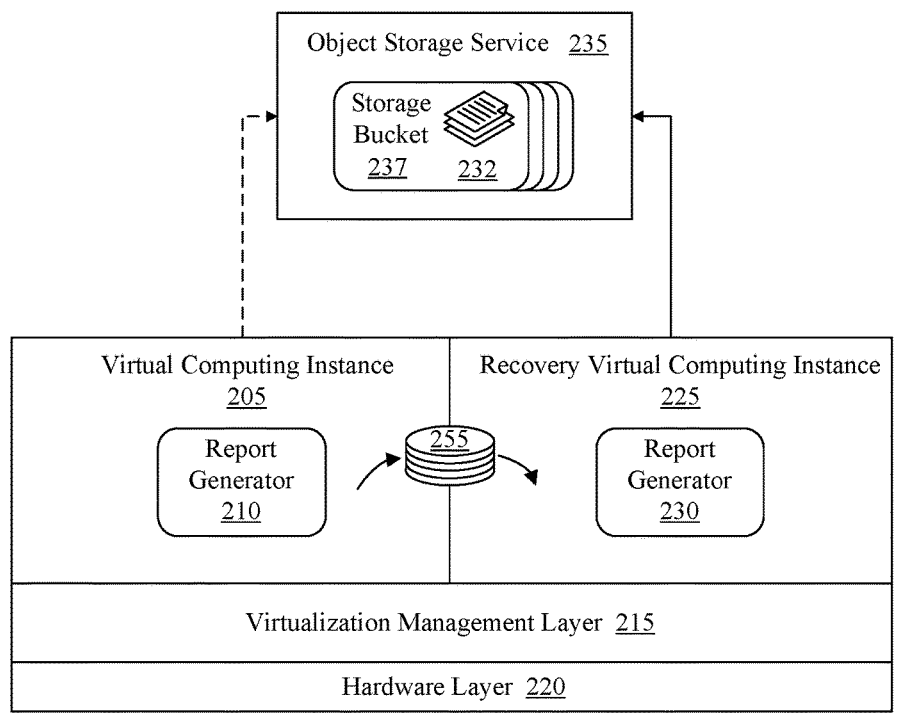
FIG. 2A is a schematic diagram of an example virtual computing instance diagnostic system, including a recovery virtual computing instance, in accordance with an example of the present technology.

FIG. 2A illustrates an example of a system using a virtual computing instance 205 and a recovery virtual computing instance 225. The virtual computing instance 205 and the recovery virtual computing instance 225 may operate on a virtualization management layer 215 and hardware layer 220, as have been described previously.

In this example, the virtual computing instance 205 may have malfunctioned in some way and diagnostics may be difficult. For example, the virtual computing instance 205 may be inoperable, unreachable, or otherwise not performing properly. As such, a report generator 210 on the virtual computing instance 205 may be unusable to generate the operating information report. The recovery virtual computing instance 225 may attempt to generate an operating information report for the virtual computing instance 205 using a report generator 230. However, if access is unavailable or the virtual computing instance 205 has crashed, the root node or storage volume 255 of the virtual computing instance 205 may be mounted to the recovery virtual computing instance 225, after which the report generator 230 may be used to generate the operating information report. In other words, the storage volume 255 may be unmounted from the virtual computing instance 205 and mounted to the recovery virtual computing instance 225 for generation and processing of the operating information report. The recovery virtual computing instance 225 may then send the operating information report to the storage bucket 237 at the object storage service 235 for processing.

In one example, the report generator 210 or 230 may be initiated by a customer who owns the virtual computing instance 205 by entering a command via a command prompt or by selecting an option via a graphical user interface. The report generator may proceed to gather data and may produce a compressed report file. Depending on the virtual computing instance, the report generator may take anywhere from seconds or minutes up to an hour or more to generate an operating information report. The operating information report may be configured to leave the virtual computing instance unmodified, other than optional creation and storage of the compressed report file on the virtual computing instance. The compressed report file may alternatively be stored in memory and transmitted to the object storage service 235 without storage at local virtual computing instance storage. The compressed report file may be "unpacked" or decompressed using any of a variety of existing compression/de-compression utilities.

The report generator 210 or 230 may provide notice to the user regarding the nature of the detailed information about the hardware, software or the like identified for the virtual computing instance, as well as notice regarding the usage of the information for diagnostic purposes and that the information will be considered confidential. Before the operating information report file is transferred to the object storage service 235, the user may be prompted to confirm whether to proceed with the operating information report. The user may further optionally be asked some questions, such as a name or identification of the user, a reason for generating the operating information report, a case number for which the operating information report is being generated and so forth. Additionally, the user may be permitted to specify other parameters for creating the operating information report, such as a specific type of data to collection, a location of data to collect, how to handle certain data collected, whether to include particular errors in the operating information report, whether there is a preference for particular avenues of resolution of discovered issues and so forth. Some of the user-configurable options, switches or parameters for report generation may be used to control what data is collected, which may be particularly useful if the report generator "hangs" or terminates on some item or is otherwise unable to continue data collection during a collection phase of the report generation.

Inside the unpacked report data may be any number of files and/or subdirectories. For example, some directories may include: boot, etc, sys, lib, root, proc, var and so forth. Some example files may include: java, lspci, pstree, sar27, chkconfig free, mount, sestatus, uname, date, hostname, lsb-release, netstat route, uptime, df, ifconfig, lsmod, sar10, dmidecode, lsof, ps, sar17 and installed-rpms. Many of the files may be named similarly to common Linux commands and the directories may be similar to common Linux root level directories. What data is captured may vary from virtual computing instance to virtual computing instance depending on what is installed on a particular virtual computing instance.

The following are brief descriptions of at least some of the files which may be potentially included in an example operating information report:

java—contains information on the Java Runtime Environment including versions and locations of key files.

lspci—contains output from the lspci command which provides information about PCI (peripheral component interconnect) devices on or used for the virtual computing instance.

pstree—a complete process list from the system in parent child relationship.

sar<nn>—System Activity Report (SAR) performance data captured and processed for the date of the generated report.

chkconfig—a listing of the chkconfig startup, or in other words a list of applications and daemons which are started for the virtual computing instance run level.

free—output from a free memory information command.

mount—output from a mount command, such as may indicate which file systems are mounted.

sestatus—provides indication as to whether a Security Enhanced operating system is enabled.

uname—provides the kernel version.

date, hostname—Date and Host name.

lsb-release—Description of the operating system release.

netstat, route—output from standard networking commands.

Uptime, df, ifconfig, lsmod—includes uptime of system, file system usage, network interface configuration, and kernel module list.

dmidecode—hardware information, such as bios version, system serial number and so forth.

installed-rpms—a list of software packages installed.

lsof and ps—lists of open files and running processes.

In addition to a number of top level diagnostic files, an unpacked report may contain a number of directories and subdirectories, as has been described. Some examples of these may be as follows:

The boot directory—contains files from the system's/boot directory. Of special interest may be a boot/grub/grub.conf file which contains the definition of the grub boot menu and information on which kernel image is booted by default and which switches were provided during boot to that image.

The etc directory—contains system configuration files from the system's/etc directory including several subdirectories. The list of files may be extensive and may include network configuration files along with other configuration data. Other contents of the etc directory may include module and network-scripts information, for example.

The proc directory—contains various process data related to the running kernel.

The var/log directory—contains system logs. After gathering general information about the configuration of a virtual computing instance, this data may be useful in identifying and analyzing log entries leading up to a hang or crash, or whatever other event may have lead the user to create an operating information report.

Often operating information reports may be generated in response to a crash or malfunction of the virtual computing instance, such as may involve rebooting of the virtual computing instance to get the virtual computing instance up and running again. When a precise time of the event is unavailable, the time may sometimes be located by searching messages files in the var/log directory. The messages may indicate a date and time at which a virtual computing instance was rebooted. Messages prior to the date and time may be analyzed to find data indicating when or where issues began occurring. In connection with the data contained in the operating information report, time stamps may be used to correlate any recorded hardware errors.

The present technology may manage operating information reports for virtual computing instances using virtualized computing technologies. Virtualized computing is the use of computing resources (hardware and software) which are available in a remote location from the users of the computing resources and the virtualized computing resources are accessible over a network, such as the Internet. Users are able to buy these computing resources (including storage and computing power) as a utility on demand and sometimes by the hour. Virtualized computing entrusts remote services with a user's data, software and computation. Use of virtual computing resources can provide a number of advantages including cost advantages and/or ability to adapt rapidly to changing computing resource needs.

Web services may be associated with the virtualized computing. A web service may be a software function provided at a network address over the web or the internet. Clients may initiate requests to servers; and the servers may process requests and return the appropriate responses. The client requests are typically initiated using an API (application programming interface) request. An API is a programmatic interface to a defined request-response message system, sometimes expressed in JSON (JavaScript Object Notation) or XML (Extensible Markup Language), which is often exposed via the web by means of an HTTP (Hypertext Transfer Protocol)-based web server.

Client-side endpoint configuration can be accomplished by allowing a client to include as part of a network request (e.g., an API request), a desired endpoint for subsequent notifications from a server. The endpoint can be an endpoint identifier, such as a Uniform Resource Identifier (URI) or a domain name. The URI can be a variety of types of identifiers, such as Uniform Resource Locators (URL) or a Uniform Resource Name (URN). The URI can include an IP (Internet Protocol) address/hostname. When a web service receives the API request from a client device, the web service can generate a response to the request and send the response to the endpoint identified in the request.

A virtual network provider (i.e., a virtualization provider) may be capable of delivery of computing and storage capacity as a service to a community of end recipients. In an example embodiment, the virtual network provider may be established for an organization by or on behalf of the organization. That is, the virtual network provider may offer a "virtual private cloud environment." In another embodiment, the virtual network provider may support a multi-tenant environment, wherein a plurality of customers may operate independently (i.e., a public cloud environment). Generally speaking, the virtual network provider may provide the following models: Infrastructure as a Service ("IaaS"), Platform as a Service ("PaaS"), and/or Software as a Service ("SaaS"). Other models may also be provided. For the IaaS model, the virtual network provider may offer computers as physical or virtual machines and other resources. The virtual machines may be run as guests by a hypervisor, as described further below. The PaaS model may deliver a computing platform that can include an operating system, programming language execution environment, database, and web server. Application developers may develop and run software solutions on the virtual network provider platform without the cost of buying and managing the underlying hardware and software. The SaaS model allows installation and operation of application software in the virtual network provider. In some embodiments, end users may access the virtual network provider using networked client devices, such as desktop computers, laptops, tablets, smartphones, etc. running web browsers or other lightweight client applications.

In one example, a virtual network provider may include any number of server computers. The server computers may provide computing resources for executing software or virtual computing instances, which may also be referred to as virtual computing instances or virtual machines. A virtual machine may be an instance of a software implementation of a machine (i.e. a computer) that executes applications similarly as a physical machine. In the example of virtual machine, each server may be configured to execute an instance manager capable of executing the virtual computing instances. The instance manager may be a hypervisor or another type of program configured to enable the execution of multiple instances on a single server. Additionally, each of the instances may be configured to execute one or more applications.

It should be appreciated that although the embodiments disclosed herein are described primarily in the context of virtual computing instance or virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

Figure 2B:
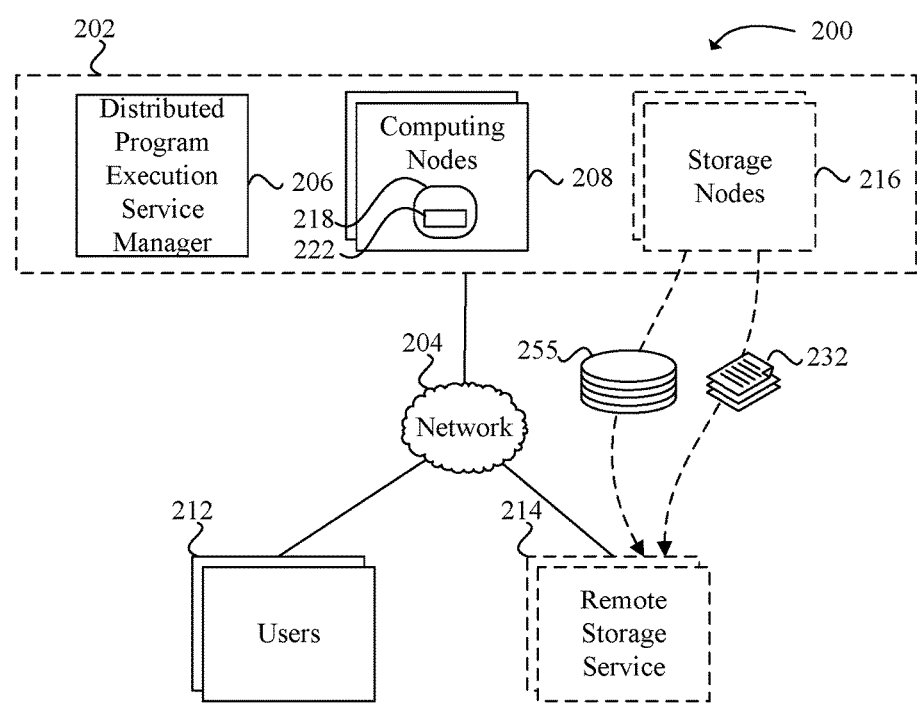
FIG. 2B is a network diagram of an example distributed computing system in accordance with an example of the present technology.

FIG. 2B is a network diagram of an example distributed computing system 200 such as may be implemented for any of the examples of the present technology described herein. A number of users 212 may be interacting over a network 204 with an exemplary Distributed Program Execution Service System Manager (DPE Service SM or DPESSM) module 206 to initiate distributed execution of applications on one or more computing nodes 208 that are available for executing applications of the users. For example, a DPESSM module 206 may provide some or all of the functionality of a DPE (Distributed Program Execution) service.

The network 204 may, for example, be a publicly accessible network of linked networks such as the Internet, and possibly operated by various distinct parties. Alternatively, the network 204 may be a private network, such as, for example, a corporate or university network that is wholly or partially inaccessible to non-privileged users. Further, the network 204 may include one or more private networks with access to and/or from the Internet. The DPESSM module 206 and the computing nodes 208 may be provided by a DPE service provider 202 as part of a DPE service, as well as one or more optional other storage nodes 216 and the DPESSM module 206 may execute on one or more other computing systems. The dashed lines of the storage nodes 216 and the remote storage services 214 indicate that these components are optional. Similarly, the dashed lines of the DPE service provider indicate that the enclosed components may or may not be proximately located, for instance, in the same machine, in the same local network, or in the same data center.

The illustrated computing nodes 208 may be provided by the DPE service provider 202 for distributed execution of applications on behalf of the users, and may include multiple physical computing systems and/or multiple virtual machines that are hosted on one or more physical computing systems. Each of the computing nodes 208 may have some amount of computing resources available for executing one or more applications, such as may be measured, for example, by a combination of one or more of: processing capacity, memory capacity, storage capacity, disk I/O capacity, etc. The DPE service provider 202 may provide preconfigured computing nodes, with each preconfigured computing node having similar and/or equivalent amounts of computing resources available for executing applications on behalf of users, while in other examples, the DPE service provider 202 may provide a selection of various different computing nodes, such as with different types or groups of computing nodes having varying amounts and/or types of computing resources. The computing nodes 208 may each include one or more virtual computing instances 218 and at least a portion of an application code package 222.

The various users 212 may interact with the DPESSM module 206 to make requests, submit data and otherwise interact with applications, system components and so forth. Such user requests may be made at various times, such as when a user registers to use services of the DPE service and/or at later times. For example, the users may interact with the DPESSM module 206 to initiate and configure execution of applications in various ways, such as by specifying a number and/or type of computing nodes for execution of applications, a minimum and/or maximum number of computing nodes to use, a preferred execution time and/or period of execution, an expiration time for the application execution request, a selection of one of multiple priorities for the execution. A user may interact with the DPESSM module 206 to request immediate execution of one or more applications on a specified number of computing nodes and/or to schedule such execution at one or more future times, such that the DPESSM module 206 may initiate the requested execution on the specified number of computing nodes at a specified time or when one or more specified criteria are satisfied.

The DPE service may provide a variety of functionality for managing distributed execution of applications for multiple users on the computing nodes 208. For example, as previously noted, a particular user may use a GUI (graphical user interface) or API provided by the DPESSM module 206 to submit a request for execution of an indicated application using indicated input data, optionally along with a variety of other types of configuration information. After the request for execution of the application is received, the DPESSM module 206 may select which of the available computing nodes 208 to use for the requested execution in various ways. The DPESSM module 206 may simply select an appropriate quantity of computing nodes from any of the available computing nodes with sufficient resources, such as, for example, by randomly selecting from a pool of available computing nodes. One or more specific computing nodes may be selected on the basis of one or more other factors, such as, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, etc. In addition, after the request is received, the DPESSM module 206 may further determine how to separate the indicated application into multiple execution jobs to be executed on the multiple selected computing nodes, such as by using information supplied by the user and/or in an automatic manner based on previously obtained information about the design of the indicated application. The DPESSM module 206 may determine how to separate the indicated input data into multiple subsets for use by the multiple execution jobs. For example, in some situations, each execution job may include executing a full copy of the indicated application but on a particular subset of input data, while the other execution jobs similarly execute the full application copy functionality on other input data subsets. Alternatively, in some situations, various execution jobs may perform different functions on a single common set of input data.

As the execution jobs execute on the various computing nodes, the execution jobs may store various information locally on the computing nodes. In addition, the DPE service may optionally provide one or more storage nodes 216 that are used by the DPE service to store information related to application execution and/or for other purposes. As discussed in greater detail elsewhere, such information stored on the storage nodes 216 may include status information regarding the intermediate state of partial execution of various execution jobs for various applications, and may optionally include output data that is generated by completed execution jobs.

In addition, as the execution jobs of an application execute in a distributed manner on the various computing nodes of a cluster for that application, the DPE service may automatically perform various actions to dynamically monitor and/or modify the ongoing distributed execution of the application. For example, the dynamic modifying of the ongoing distributed execution of the application on the multiple computing nodes of the cluster may include optionally performing various types of changes in certain situations, and the DPESSM module 206 may select which types of actions to pursue in which situations (e.g., based on predefined criteria specified generally for the DPE service, or specified specifically for the application being executed or other user on whose behalf the application is being executed). For example, if the DPESSM module 206 automatically determines to dynamically add and/or remove computing nodes from the cluster, the DPESSM module 206 may further select which computing nodes to add or remove, such as in a manner to the selections made initially by the DPESSM module 206 in selecting particular computing nodes for the cluster. In addition, if the DPESSM module 206 automatically determines to make other types of changes to the ongoing distributed application execution, the DPESSM module 206 may similarly determine which types of changes to make.

Furthermore, the DPESSM module 206 may provide indications to cause the intermediate state of partial execution of one or more execution jobs to be persistently stored before the partial execution of the execution job is temporarily terminated or otherwise suspended. Such intermediate state information for the partial execution may be stored in various manners remotely from the computing node on which the partial execution occurred, such as by copying such intermediate state information to one or more of the optional storage nodes 216 and/or by using one or more optional remote storage services 214 that are accessible over the network 204. In one example, a virtual computing instance volume 255 may be unmounted from a virtual computing instance, moved or copied to a remote storage service 214 and mounted to a recovery virtual computing instance, as described above with reference to FIG. 2A for recovery. In another example, an operating information report 232 from a virtual computing instance 218 may be initially copied to a storage node 215 and then copied from a storage node 216 to a remote storage service 214 for processing or for access by one or more users or diagnostic technicians.

The DPESSM module 206 may coordinate the storage of the intermediate state information from the computing node to the remote persistent storage location, such as by using information that the DPESSM module 206 tracks about the intermediate state of the partial execution, while in other examples the activities in performing the persistent storage of the intermediate state information may instead be performed by management software executing on the computing node to locally manage the execution of the execution job. Alternatively, if a particular executing execution job is able to store its own intermediate execution state, the DPESSM module 206 may instead notify the execution job to perform its own intermediate execution state storage actions before shutting down its own execution. After the intermediate state of partial execution of an execution job has been persistently stored and the partial execution has been terminated, the partial execution may be resumed from that suspended intermediate state at a later time, such as substantially immediately, or instead after a longer period of time. At the time of execution resumption, the stored intermediate state information may be retrieved from the persistent storage location, and be locally stored on or otherwise made available to the computing node on which the execution job execution is to resume. In addition, the partial execution of the execution job may be resumed in various manners, such as by indicating to the execution job not to perform a subset of operations that were previously completed, by modifying the execution job to only perform a subset of the operations that were not previously completed, etc.

Figure 3:
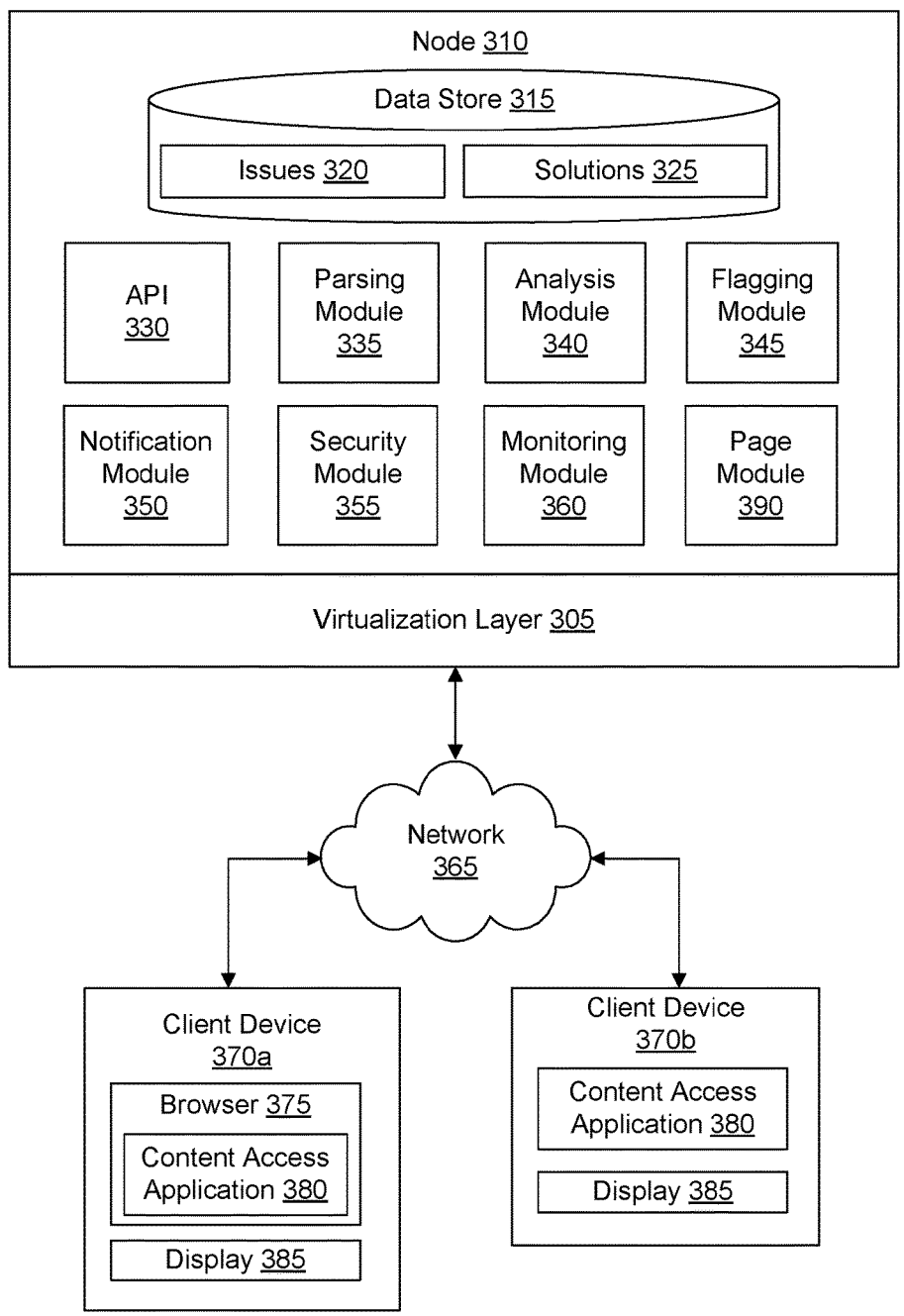
FIG. 3 is a block diagram of a system for identifying virtual computing instance issues in accordance with an example of the present technology.

Referring now to FIG. 3, a block diagram of a system is illustrated that may be used for identification of virtual computing instance issues in accordance with an example of the present technology. The node 310 may be an implementation of a node in a virtualized computing system, as described with reference to FIG. 2A, and may be implemented on a virtualization layer 305, as described with reference to FIG. 1. The node 310 may be a server in a virtualized or distributed computing system and the client devices 370a-370b may be used by users or diagnostic technicians to interact with the virtualized computing system using, for example, a client application 380 or browser application 375 and a display 385 on the client device 370a, 370b. The node 310 may include a data store 315 and a number of modules 330, 335, 340, 345, 350, 3555, 360, 390 for storing and processing data. In one example, these modules may be used in a management service 145, as illustrated in FIG. 1.

An issues data store 320 may include, for example, data related to potential issues which are known to occur and which a virtual computing instance may experience. The issues data store 320 may include identifications and/or descriptions of the issues as well as scripts or other data which may be used in recognizing an issue in an operating information report. The issues data store 320 may be populated according to issues experienced or encountered on various virtual computing instances within a virtualized computing environment. The scripts and other data may be submitted by users or diagnostic technicians. Scripts created in response to an issue for a particular user's virtual computing instance may be available solely for future use by the particular user or for the particular virtual computing instance, or may be made available for diagnostic use with reports from any other user or virtual computing instance. The scripts may optionally be read-only or may have write permissions as well so that the scripts can be updated over time by technicians. In one example, the scripts may include machine learned scripts, as will be described in greater detail later. In another example, scripts may check to see whether certain numerical metrics have gone outside a defined range or whether a value is incorrectly set.

A solutions data store 325 may optionally be present and may include, for example, data related to solutions to known issues which may be potentially encountered by a virtual computing instance. The solutions data store 325 may include identifications and/or descriptions of solutions to issues and may be correlated (e.g., ranked based on relatedness or directly mapped) to issues included in the issues data store 320. The solutions data store 325 may include multiple potential solutions for any given issue in the issues data store 320. Solution data from the solutions data store 325 may be transmitted to a user or to a diagnostic technician to assist in resolving issues discovered from the operating information report. The solutions data store 325 may optionally include scripts for resolving discovered issues in the absence of manual or user intervention. The scripts may be submitted to the solutions data store 325 by users or diagnostic technicians. The scripts in the solutions data store 325 may be made widely available to any user or may have more limited or restricted access and use, as may depend upon system configurations, user preferences or the like. The solutions scripts may also include machine learned scripts, as will be described later.

While FIG. 3 illustrates data store 315 as including the issues data store 320 and the solutions data store 325, these respective data stores may be independent of one another and may be stored separately from one another as opposed to being different portions of a same data store (i.e., data store 315).

The node 310 may interface with the network 365. In this way, the node 310 may be able to communicate with the client device 370a, 370b. This communication may be further operable with various modules within the node 310. For example, the monitoring module 360 may communicate with the client device 370a, 370b over the network 365 directly or via one or more intermediate modules.

The system may include an API 330 to receive an operating information report. In one example, the API may be configured to respond differently to requests for data received from virtual computing instances depending on a URL used to access the API or information sent via the API from the virtual computing instances, such as whether the URL includes a report identification. For example, when the API is called without a report identification number in the URL, the API may enable the system to receive an operating information report generated by a virtual computing instance but the API may not facilitate loading of an existing operating information report or processed result thereof. When the API is called with a report identification by the user, the API may cause virtual computing instance diagnostic information to be retrieved and provided to the user. The diagnostic information may optionally include review or solution information by a diagnostic technician. The virtual computing instance diagnostic information may include any available or suitable information from the issues data store 320 and/or solutions data store 325 as may be applicable for issues identified from the operating information report.

The system may include a parsing module 335 to parse the operating information report to obtain a diagnostic result. The parsing module 335 may take input text and build a data structure (such as a parse tree, abstract syntax tree or other hierarchical structure, for example) giving a structural representation of the input, while checking for correct syntax in the process. The resultant data structure may be configured for use by an analysis module 340.

The system may include an analysis module 340, which may use the issues data store and the diagnostic result (i.e., the output of the parsing module 335) to determine whether there is an existing issue for the virtual computing instance. For example, the analysis module may execute one or more scripts in the issues data store 320 for identifying potential issues in the operating information report.

The system may include a flagging module 345. The flagging module 345 may flag existing issues when present. In other words, when the scripts identify an issue in the diagnostic result, the issue may be flagged. The user or a diagnostic technician may optionally be notified of flagged issues. Flagged issues may be compiled into a flagged issues report, which may include any available data related to the flagged issues, such as cause, solution, description and so forth.

The system may include a notification module 350 to notify a user of the virtual computing instance of at least one of a potential cause or a potential solution to the existing issue, such as through the flagged issues report. The flagged issues report may be made available to the user and/or the diagnostic technician through a virtual computing storage bucket, which may be accessible for a limited time to users with the appropriate credentials or report identification and so forth. For example, flagged issues reports may be available for 30 days from creation in a read-only format, and may be accessible to users in possession of the report identification. In one example, the flagging module 345 may also flag an operating information report when an issue is recognized to be present (e.g., when data indicates the virtual computing instance is underperforming or somehow misbehaving) but the scripts do not identify a known issue. In this example, a human may manually review the operating information report to identify a cause and potential solution. The cause and solution may be documented and added to the issues and solutions data stores 320, 325.

The system may include a security module 355. The security module 355 may be used to implement security precautions to protect user privacy and user data in any of a number of different ways. For example, the security module 355 may restrict submission of the operating information report to submissions through the API via a temporary, signed URL. Any attempted submissions not submitted through the API may be rejected. The security module 355 may restrict access to the operating information report by a user to access requests through the API including the report identification. In other words, access requests missing the report identification may be rejected or dropped.

In one example, the security module 355 may restrict access to the operating information report by a diagnostic technician to a subset of information included in the operating information report and to access via an administration interface. Although a user may be willing to permit a diagnostic technician to review sufficient detail of the operating information report to assist in resolving any issues, the operating information report may include a great deal of information which may be unrelated to any potential issues but which may be sensitive, or rather to which the user does not wish to be made available to the diagnostic technician. In one example, the analysis module 340 may perform an analysis on the operating information report and information that is irrelevant to any identified issues may be excluded from access by the diagnostic technician. In another example, the data in the operating information report that is available in identified folders, locations or available through identified processes on the virtual computing instance may be restricted from access by the diagnostic technician. In another example, access to certain data may be restricted on a report-by-report basis as dictated by the user requesting the operating information report.

The system may include a monitoring module 360. The monitoring module 360 may be configured to receive a plurality of the operating information reports from a same virtual computing instance over time. The monitoring module 360 may use the successive reports to identify issues when changes to the virtual computing instance occur which trigger at least one of the scripts. The monitoring module 360 may receive operating information reports on a periodic basis, such as monthly, weekly, daily, hourly, minute-by-minute and so forth. In one aspect, the operating information reports may be combined as a single continuous operating information report generated continuously, where changes in data included in the report are analyzed by the scripts and data that is unchanged is not analyzed to conserve computing resources.

Operating information reports, identification of issues, resolution of issues and so forth may be used to create one or more machine learned models for identifying and resolving issues. For example, the model may learn from the successes of previous issue identifications and solutions to determine whether a particular identification or solution is likely to be accurate for a given set of circumstances in a future operating information report. The system may log a wide variety of data points included in each operating information report, including what issues were identified using which scripts, which solutions were suggested, feedback from users on whether the issues were accurately identified, feedback from users or in the form of subsequent operating information reports as to whether suggested solutions were successful and so forth. In other words, a wide variety of considerations may be included as part of a machine learning approach for creating and optimizing the model. The model may be learned using any of a variety of machine learning technologies.

Machine learning may be useful as a method that takes as input empirical data and yields patterns or predictions which may be representative of the underlying mechanism or process that resulted in the generation of the data. Machine learning systems may take advantage of data to capture characteristics of interest having an unknown underlying probability distribution. Machine learning may be used to identify possible relations between observed variables, such as aspects of user interaction with respect to time and page requests. Machine learning may also be used to recognize complex patterns and make intelligent decisions based on input data. In some examples, machine learning systems may generalize from the available data to produce a useful output, such as when the amount of available data is too large to be used efficiently or practically. As applied to the present technology, machine learning may be used to make modifications to issue identification and/or resolution on a basis of context, success or on any other suitable basis in order to test whether an accuracy or success of identification or resolution of issues is improved through the modification.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data preprocessing. Specific details regarding any of the examples of supervised, unsupervised, temporal difference or other machine learning described in this paragraph that are generally known are also considered to be within the scope of this disclosure.

The system may include a page module 390 for displaying network pages, including user interfaces, issue data, report data and any other suitable object or data for facilitating or enhancing user interaction with the system. The page module 390 may be used for providing data, graphical user interfaces and so forth for display on the client device 370a, 370b.

In one aspect, the page module 390 may enable user feedback on the issue identification or solutions, and may enable submission of scripts. For example, the user may be enabled to rate performance or accuracy of identifications, suggested solutions, etc. The rating may be a quantitative rating, such as a rating out of five stars, or the rating may be qualitative, such as to indicate whether the identification or solution is relevant, useful, helpful, etc. The rating may also be a comment or other textual feedback, and may optionally be in the form of computer programming code in the form of a script. Use of user feedback may serve multiple purposes. The user feedback may assist in identifying personal preferences of an individual user such that future issues may be addressed in a manner tailored to the specific user.

The node 310 may comprise, for example, a server computer, a virtual server image, or any other system providing computing capability. Alternatively, a plurality of nodes 310 may be employed that are arranged, for example, in one or more server banks or computer banks or other arrangements to form a distributed computing system.

Client devices 370a-370b may access data, reports and so forth via the node 310 over the network 365. In other words, access to a storage bucket may be available via the node 310, in one example. In another example, an operating information report or processed result thereof stored in the storage bucket may be accessed via the browser 375. Example client devices 370a-370b may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 385.

Various processes and/or other functionality, as discussed herein, may be executed according to various examples. The node 310, may for example, provide some central server processing services while the client device 370a, 370b may provide local processing services and interface processing services to interface with the services of the node 310. Therefore, it is envisioned that processing services, as discussed herein, may be centrally hosted functionality or a service application that may receive requests and provide output to other services or customer devices.

For example, the services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. A processor may provide processing instructions by communicating with a memory on the node 310. In other words, the memory device may include instructions operable to be executed by the processor to perform a set of actions. The processor and/or the memory may directly or indirectly communicate with the data store 315. The processor, memory and the node 310 may be virtualized.

Various data may be stored in the data store 315 that is accessible to the node 310. The term "data store" may refer to any virtualized device or combination of physical and virtual devices capable of storing, accessing, organizing and/or retrieving data, which may include any combination and number of data servers, relational databases, object oriented databases, data storage devices, data warehouses, flat files and data storage configuration in any centralized, distributed, or clustered environment. The storage system components of the data store 315 may include storage systems such as a SAN (Storage Area Network), a cluster storage network, volatile or non-volatile RAM, optical media, or hard-drive type media. The data store 315 may be representative of a plurality of data stores 315.

The client devices 370a, 370b shown in FIG. 3 are representative of a plurality of client devices that may be coupled to the network. The client devices may communicate with the node 310 over any appropriate network, including an intranet, the Internet, a cellular network, a local area network (LAN), a wide area network (WAN), a wireless data network or a similar network or combination of networks.

Each client device 370a, 370b may include a respective display 385. The display 385 may comprise, for example, one or more devices such as cathode ray tubes (CRTs), liquid crystal display (LCD) screens, gas plasma based flat panel displays, LCD projectors, or other types of display devices, etc.

Each client device 370a, 370b may be configured to execute various applications such as a browser 375, client application 380 and/or other applications. The browser 375 may be executed in a client device 370a, 370b, for example, to access and render pages, such as web pages or other network data served up by the node 310 and/or other servers. The client application 380 may be executed to obtain and render for display data from the node 310, or other services and/or local storage media. A client device may be a hardware device which is used by the user to access a virtual computing instance.

In some embodiments, the client application 380 may correspond to code that is executed in the browser 375 or plug-ins to the browser 375. In other embodiments, the client application 380 may correspond to a standalone application, such as a mobile application. The client device 370a, 370b may be configured to execute applications beyond those mentioned above, such as, for example, mobile applications, email applications, instant message applications and/or other applications. Users at client devices 370a, 370b may access data, such as the processed result of operating information reports, through display devices or through client applications 380 executed in the client devices 370a, 370b.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 4:
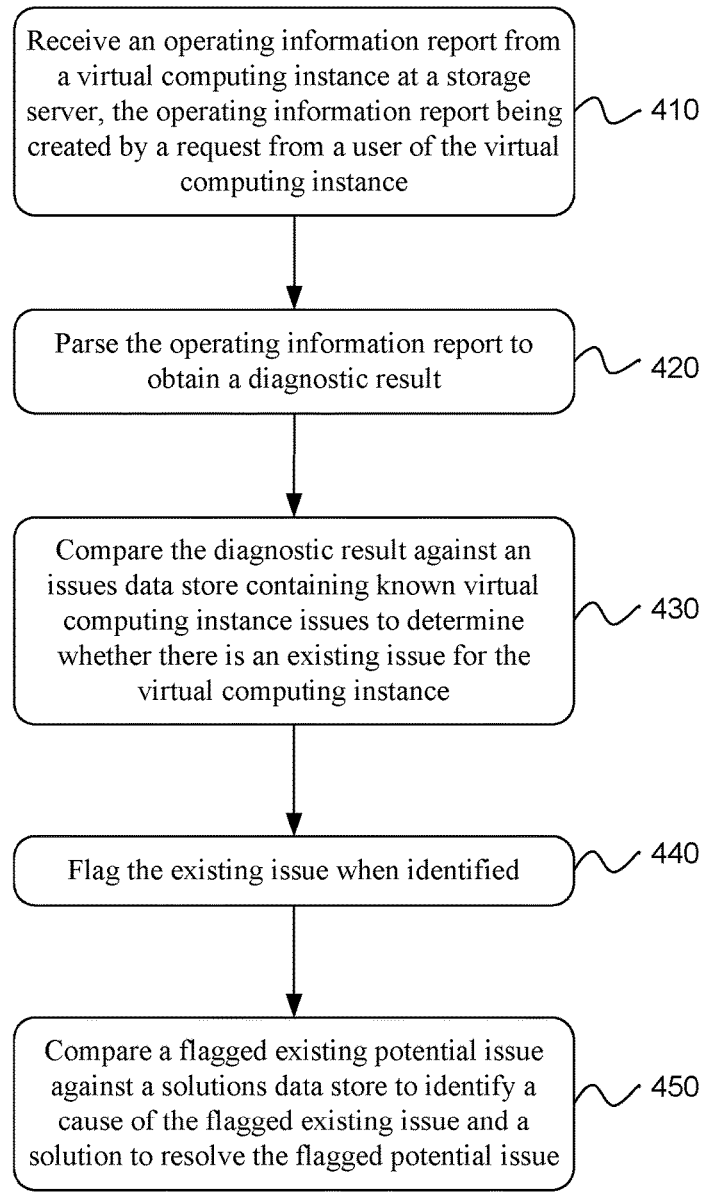
FIG. 4 is a flow diagram of a method for identifying a cause and a solution to flagged issues for a virtual computing instance in accordance with an example of the present technology.

Referring now to FIG. 4, a flow diagram of a method for identifying issues with a virtual computing instance is illustrated in accordance with an example of the present technology. The method may include receiving 410 an operating information report from a virtual computing instance at a storage service, the operating information report being created by a request from a user of the virtual computing instance. The method may further include parsing 420 the operating information report to obtain a diagnostic result and comparing 430 the diagnostic result against an issues data store containing known virtual computing instance issues to determine whether there is an existing issue for the virtual computing instance. The method may include flagging 440 the existing issue when identified and comparing 450 a flagged existing potential issue against a solutions data store to identify a cause of the flagged existing issue and a solution to resolve the flagged potential issue.

The method may include notifying the user of the cause and the solution. The method may also include receiving additional known virtual computing instance issue data and storing the additional known virtual computing instance issue data in the issues data store, such as after an unrecognized issue is identified by a human or through machine learning attempts at identifying and/or resolving issues using symptoms found in the operating information report. Similarly, the method may include receiving additional cause and solution data and storing the additional cause and solution data in the solutions data store.

In some examples, this or other methods described herein may be implemented wholly or partially as computer readable program code executed by a processor and the computer readable code may be embodied on a non-transitory computer usable medium.

Figure 5:
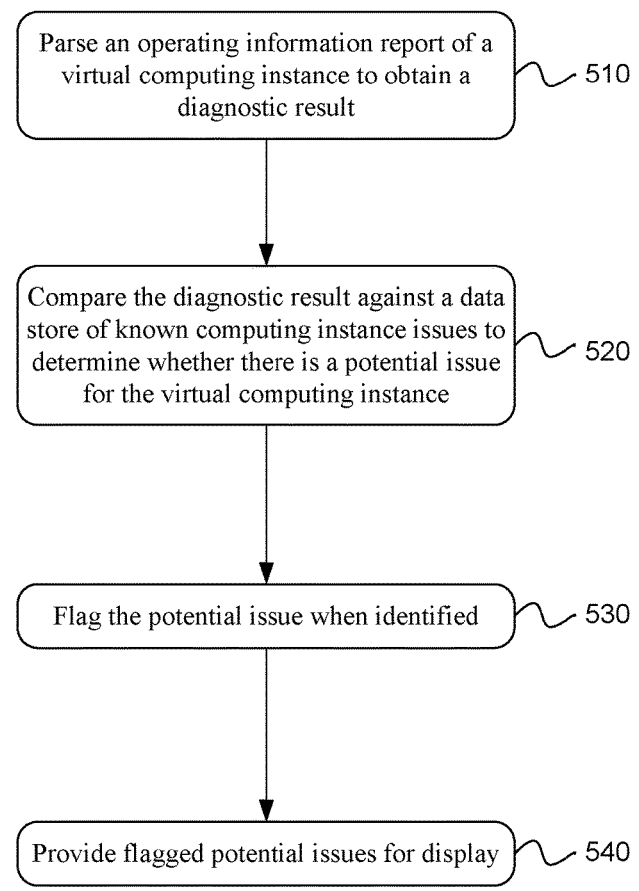
FIG. 5 is flow diagram of a method for identifying potential virtual computing instance issues in accordance with an example of the present technology.

Referring to FIG. 5, a flow diagram of a method is illustrated in accordance with the present technology in which an operating information report of a virtual computing instance may be parsed 510 to obtain a diagnostic result. The diagnostic result may be compared 520 against a data store of known computing instance issues to determine whether there is a potential issue for the virtual computing instance. The potential issue may be flagged 530 when identified (in which case the potential issue may be no longer a potential issue but may be an actual or existing issue). In one example, flagged potential issues may remain considered as a potential issue, such as if an analysis does not conclusively determine that the flagged issue is an actual issue. The flagged potential issue may be provided 540 for display to a user or a diagnostic technician.

The method may include comparing the flagged potential issue against a solutions data store to identify a cause of the flagged potential issue and a solution to resolve the flagged potential issue. The method may also include storing the operating information report as a read-only report with access limited to the user and a diagnostic technician.

In one example, the method may include receiving the operating information report at a virtual storage location or bucket associated with the virtual computing instance. The operating information report may have been created by request from a user of the virtual computing instance. The flagged potential issues may be provided for display to a diagnostic technician via the storage bucket. The operating information report may be received at the storage bucket via an Application Programming Interface (API) using a temporary, signed Uniform Resource Locator (URL).

The method may also include generating a report identification (ID) in response to receiving the operating information report at the storage bucket and transmitting the report identification (ID) to the virtual computing instance. Additionally, a subsequent request for report information may be received via the API from the virtual computing instance and providing the flagged potential issues for display in response to the subsequent request.

In some examples, the method may include expiring the operating information report after a predetermined period of time. The predetermined period of time may be a set or fixed period of time or may be vary depending on user preferences, number of reports requested to be stored, subscription levels and so forth. In some examples, the method may include restricting access to portions of the operating information report to ensure privacy of a user of the virtual computing instance. Additional technology configurations may include receiving scripts from a plurality of users for identifying the known computing instance issues and storing the scripts in the data store of known computing instance issues, the scripts including scripts for identifying the known computing instance issues across a plurality of computing platforms.

In one example, the method may include copying a storage volume or root storage device of the virtual computing instance to another virtual computing instance, such as the recovery virtual computing instance described in connection with FIG. 2A, when the virtual computing instance is non-contactable. The method may include generating the operating information report from the recovery virtual computing instance.

Figure 6:
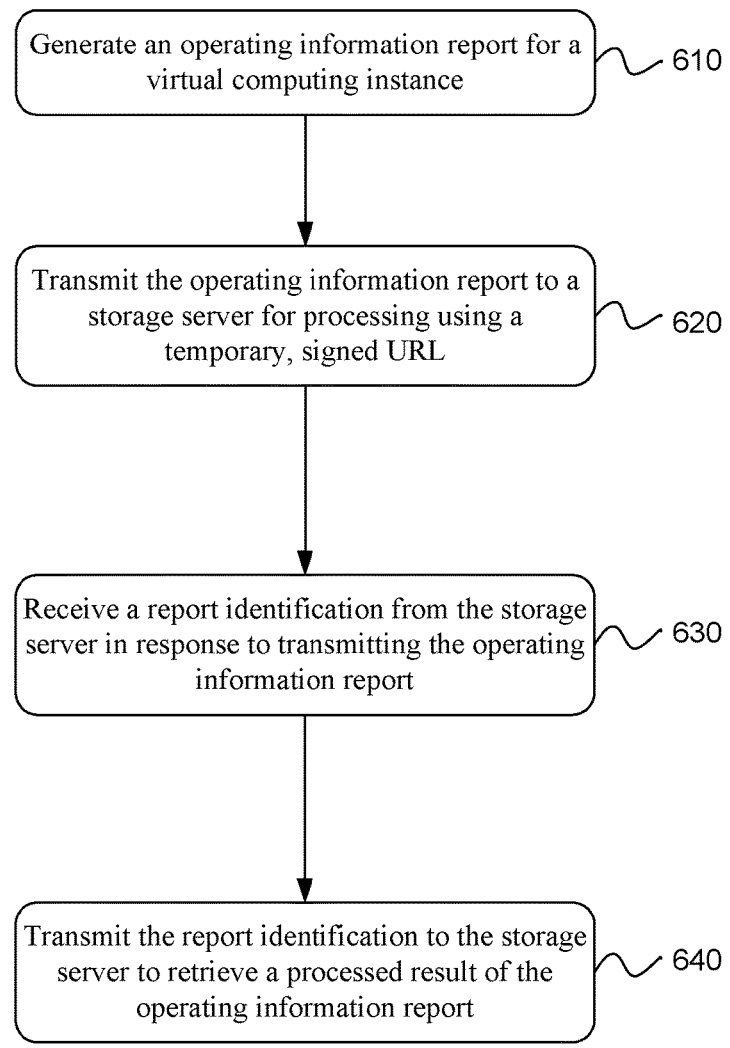
FIG. 6 is a flow diagram of a method for generating a virtual computing instance operating information report and receiving a processed result of the operating information report in accordance with an example of the present technology.

Referring now to FIG. 6, a flow diagram of a computer-implemented method for identifying virtual computing instance issues is illustrated in accordance with an example of the present technology. The method may be performed under the control of one or more computer systems configured with executable instructions, and may include, for example, generating 610 an operating information report for a virtual computing instance. The method may further include transmitting 620 the operating information report to a storage location for processing using a temporary, signed URL. A report identification may be received 630 from the storage location in response to transmitting the operating information report. The report identification may be subsequently transmitted 640 to the storage location to retrieve a processed result of the operating information report. The method may further include receiving information relating to a cause of an issue with the virtual computing instance and a solution to the issue with the processed result.

Figure 7:
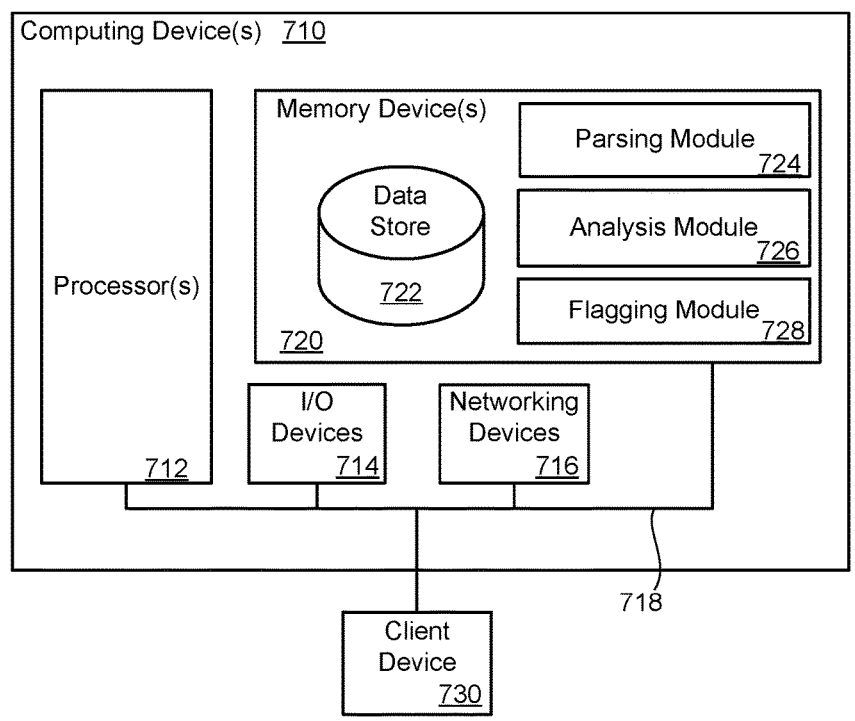
FIG. 7 is a block diagram of a system for identifying virtual computing instance issues in accordance with an example of the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules that are executable by the processor(s) and data for the modules. Located in the memory device 720 are modules executable by the processor. For example, a parsing module 724, an analysis module 726, and a flagging module 728, as well as other modules, may be located in the memory device 720. A data store 722 may also be located in the memory device 720 for storing data related to the modules and other applications along with an operating system that is executable by the processor(s) 712.

The computing device 710 may further include or be in communication with a client device 730, which may include a display device. The client device 730 may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method for identifying virtual computing instance issues, comprising:
   under control of one or more computer systems configured with executable instructions:
   receiving an operating information report from a virtual computing instance at a virtual storage location, associated with a management service, via an application programming interface (API) when the API is called;
   parsing the operating information report, at the management service, using a diagnostic script to identify an issue and to obtain a diagnostic result, wherein the parsing includes machine driven analysis resulting in a hierarchical structure showing a syntactic relation of constituents of the operating information report;
   comparing the diagnostic result, at the management service, against an issues data store containing known virtual computing instance issues to determine whether there is an existing issue for the virtual computing instance;
   flagging the existing issue when identified, at the management service; and
   comparing a flagged existing issue against a solutions data store, at the management service, to identify a cause of the flagged existing issue and a solution to resolve the flagged existing issue.

2. The computer-implemented method of claim 1, further comprising notifying a user of the cause and the solution, the operating information report being created by a request from a user of the virtual computing instance.

3. The computer-implemented method of claim 1, further comprising receiving additional known virtual computing instance issue data and storing the additional known virtual computing instance issue data in the issues data store.

4. The computer-implemented method of claim 1, further comprising receiving additional cause and solution data and storing the additional cause and solution data in the solutions data store.

5. A computer-implemented method, comprising:
   under control of one or more computer systems configured with executable instructions:
   parsing an operating information report of a virtual computing instance, at management service, using a diagnostic script to identify an issue and to obtain a diagnostic result, the operating information report being created by request from a user of the virtual computing instance, the parsing including machine driven analysis resulting in a hierarchical structure showing a relation of constituents of the operating information report;
   comparing the diagnostic result, at the management service, against a data store of known computing instance issues to determine whether there is an issue for the virtual computing instance;
   flagging the issue when identified, at the management service;
   comparing a flagged issue against a solutions data store to identify a cause of the flagged issue and a solution to resolve the flagged issue; and
   providing the flagged issue for display to a diagnostic technician via an interface.

6. The computer-implemented method of claim 5, further comprising storing the operating information report as a read-only report with access limited to a user and a diagnostic technician.

7. The computer-implemented method of claim 5, further comprising receiving the operating information report at a storage location associated with the virtual computing instance.

8. The computer-implemented method of claim 5, further comprising receiving the operating information report at a storage location via an Application Programming Interface (API) using a temporary, signed Uniform Resource Locator (URL).

9. The computer-implemented method of claim 8, further comprising generating a report identification in response to receiving the operating information report at the storage location and transmitting the report identification to the virtual computing instance.

10. The computer-implemented method of claim 5, further comprising receiving a subsequent request for report information via an Application Programming Interface (API) from the virtual computing instance and providing the flagged issue for display in response to the subsequent request.

11. The computer-implemented method of claim 5, further comprising expiring the operating information report after a predetermined period of time.

12. The computer-implemented method of claim 5, further comprising restricting access to portions of the operating information report to ensure privacy of a user of the virtual computing instance.

13. The computer-implemented method of claim 5, further comprising receiving scripts from a plurality of users for identifying the known computing instance issues and storing the scripts in the data store of known computing instance issues, the scripts including scripts for identifying the known computing instance issues across a plurality of computing platforms.

14. The computer-implemented method of claim 5, further comprising copying a storage node of the virtual computing instance to another virtual computing instance when the virtual computing instance is non-contactable and generating the operating information report from the another virtual computing instance.

15. A system, comprising:
  one or more computing nodes, each of which comprises at least one processor and a memory, wherein the one or more computing nodes are configured to collectively implement:
    an API to receive an operating information report when called without a report identification and to retrieve virtual computing instance diagnostic information when called with the report identification;
    an issues data store to store scripts to identify known virtual computing instance issues;
    a parsing module to parse the operating information report using one of the scripts from the issues data store to identify an issue and to obtain a diagnostic result, the parsing module providing machine driven analysis resulting in a hierarchical structure showing a relation of constituents of the operating information report;
    an analysis module to use the issues data store and the diagnostic result after received from the parsing module to determine whether there is an existing issue for the virtual computing instances;
    a flagging module to flag the existing issue; and
    a notification module to notify a user of the virtual computing instance of at least one of a potential cause or a potential solution to the existing issue.

16. The system of claim 15, further comprising a security module to:
  restrict submission of the operating information report to submissions through the API via a temporary, signed URL;
  restrict access by a user to the operating information report to access requests through the API including the report identification; and
  restrict access by a diagnostic technician to the operating information report to a subset of information included in the operating information report and to access via an administration interface.

17. The system of claim 15, further comprising a monitoring module to receive a plurality of the operating information reports over time at a request of a user and to identify the existing issue when changes to the virtual computing instance occur which trigger at least one of the scripts.

18. A computer-implemented method, comprising:
  under control of one or more computer systems configured with executable instructions:
    generating an operating information report for a virtual computing instance, at the virtual computing instance;
    transmitting the operating information report from the virtual computing instance to a storage location for processing;
    receiving a report identification from the storage location, at the virtual computing instance, in response to transmitting the operating information report to the storage location;
    transmitting the report identification from the virtual computing instance to the storage location to retrieve a processed result of the operating information report, wherein the processed result of the operating information report includes a flagged issue that is generated using machine driven analysis resulting in a hierarchical structure showing a syntactic relation of constituents of the operating information report; and
    receiving information relating to a cause of an issue with the virtual computing instance and a solution to the issue with the processed result.

* * * * *